US010392727B2

United States Patent
Nakagawa et al.

(10) Patent No.: US 10,392,727 B2
(45) Date of Patent: Aug. 27, 2019

(54) NANOFIBER MANUFACTURING-APPARATUS NOZZLE HEAD AND NANOFIBER MANUFACTURING APPARATUS WITH THE SAME

(71) Applicant: Kabushiki Kaisha Toshiba, Minato-ku (JP)

(72) Inventors: Yasutada Nakagawa, Yokohama (JP); Tomomichi Naka, Chigasaki (JP); Ikuo Uematsu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 121 days.

(21) Appl. No.: 15/424,165

(22) Filed: Feb. 3, 2017

(65) Prior Publication Data
US 2017/0145593 A1   May 25, 2017

Related U.S. Application Data
(63) Continuation of application No. PCT/JP2016/053809, filed on Feb. 9, 2016.

(30) Foreign Application Priority Data
Mar. 17, 2015 (JP) .................... 2015-053344

(51) Int. Cl.
*D01D 4/02* (2006.01)
*B29C 48/345* (2019.01)
(Continued)

(52) U.S. Cl.
CPC ............. *D01D 4/02* (2013.01); *B29C 48/345* (2019.02); *D01D 5/0069* (2013.01); *D01D 13/00* (2013.01); *D10B 2509/00* (2013.01)

(58) Field of Classification Search
CPC ........ D01D 4/02; D01D 5/0069; D01D 13/00; B29C 47/30; B29C 48/345; B29C 48/05
See application file for complete search history.

(56) References Cited

U.S. PATENT DOCUMENTS

| 8,163,227 B2 * | 4/2012 | Sumida ............... D01D 5/0069 264/103 |
| 2012/0004370 A1 | 1/2012 | Scott et al. |

(Continued)

FOREIGN PATENT DOCUMENTS

| JP | 64-045807 | * 2/1989 |
| JP | 64-45807 | 2/1989 |

(Continued)

OTHER PUBLICATIONS

English language abstract for JP-64-045807, Feb. 1989.*
(Continued)

*Primary Examiner* — Philip C Tucker
*Assistant Examiner* — Jimmy R Smith, Jr.
(74) *Attorney, Agent, or Firm* — Oblon, McClelland, Maier & Neustadt, L.L.P.

(57) ABSTRACT

According to one embodiment, a nanofiber manufacturing-apparatus nozzle head includes a plurality of holes. A solution is ejected from the holes. The holes are arranged from a center of the nozzle head toward an end portion of the nozzle head. An interval of adjacent holes decreases away from the center.

12 Claims, 4 Drawing Sheets

(51) Int. Cl.
*D01D 5/00* (2006.01)
*D01D 13/00* (2006.01)

(56) References Cited

U.S. PATENT DOCUMENTS

| | | | | |
|---|---|---|---|---|
| 2012/0013047 A1* | 1/2012 | Ishikawa | ............... | D01D 5/0069 264/465 |
| 2012/0248658 A1* | 10/2012 | Gleiman | ................. | A61L 15/26 264/413 |
| 2013/0273190 A1* | 10/2013 | Lee | ...................... | D01D 5/0061 425/174.8 E |

FOREIGN PATENT DOCUMENTS

| | | |
|---|---|---|
| JP | 2013-124426 | 6/2013 |
| JP | 2013-530321 | 7/2013 |
| JP | 2016-172939 | 9/2016 |

OTHER PUBLICATIONS

International Search Report dated Apr. 12, 2016 in PCT/JP2016/053809 filed on Feb. 9, 2016 (with English translation).
Written Opinion dated Apr. 12, 2016 in PCT/JP2016/053809 filed on Feb. 9, 2016.
Office Action issued in Japanese Application No. 2015-053344 dated Aug. 16, 2016 with English translation.

\* cited by examiner

NANOFIBER MANUFACTURING-APPARATUS NOZZLE HEAD AND NANOFIBER MANUFACTURING APPARATUS WITH THE SAME

CROSS-REFERENCE TO RELATED APPLICATIONS

This is a continuation application of International Application PCT/JP2016/053809, filed on Feb. 9, 2016. This application also claims priority to Japanese Application No. 2015-053344, filed on Mar. 17, 2015. The entire contents of each are incorporated herein by reference.

FIELD

Embodiments described herein relate generally to a nanofiber manufacturing-apparatus nozzle head and a nanofiber manufacturing apparatus with the same.

BACKGROUND

Nanofiber manufacturing apparatuses are being used in a wide range of fields such as the field of medicine as apparatuses that manufacture a fibrous substance having a nano-unit diameter. Electrospinning technology is used widely in nanofiber manufacturing apparatuses.

Electrospinning technology is technology in which a workpiece and a solution in which a macromolecule substance or the like is dissolved are charged; and the solution is ejected toward the workpiece by the electric potential difference between the solution and the workpiece. A nanofiber is manufactured by the solution being elongated electrically. It is desirable to increase the productivity in such a nanofiber manufacturing apparatus.

DETAILED DESCRIPTION

Figure 1:
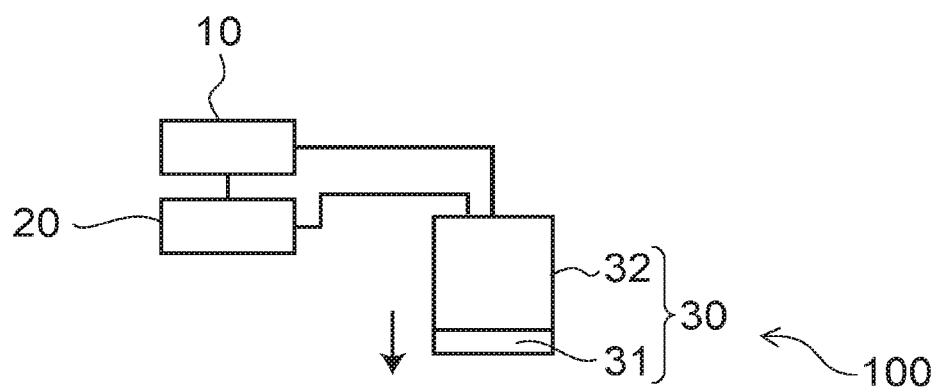
FIG. 1 is a schematic view illustrating a nanofiber manufacturing apparatus according to an embodiment.
Figure 1:
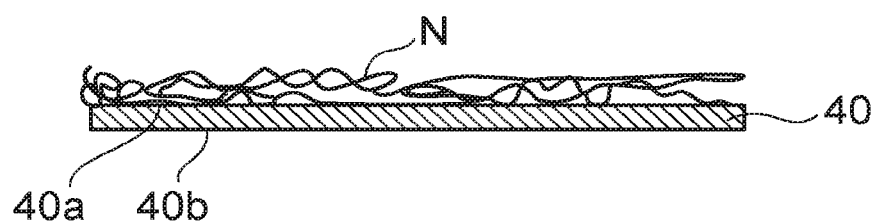

According to one embodiment, a nanofiber manufacturing-apparatus nozzle head includes a plurality of holes. A solution is ejected from the holes. The holes are arranged from a center of the nozzle head toward an end portion of the nozzle head. An interval of adjacent holes decreases away from the center.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

(Embodiment)

FIG. 1 is a schematic view illustrating a nanofiber manufacturing apparatus according to the embodiment.

Figure 2:
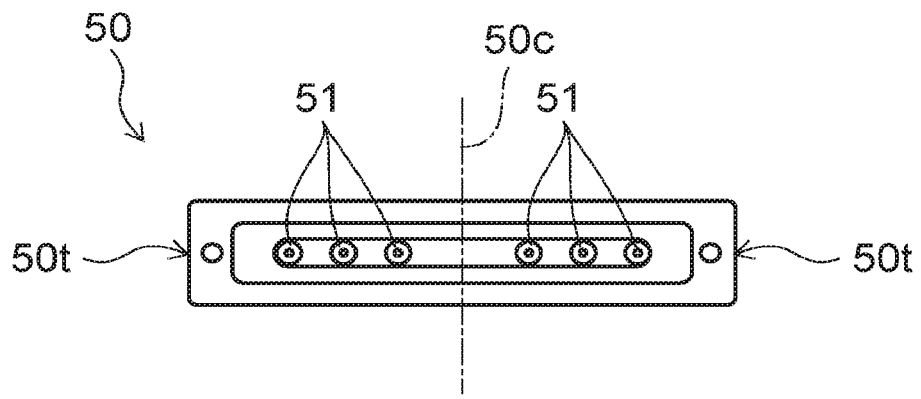
FIG. 2 is a schematic view showing a nozzle head according to the embodiment.

FIG. 2 is a schematic view showing a nozzle head according to the embodiment.

FIG. 2 shows a front view of the nozzle head 50 as viewed from the side that ejects a solution.

As illustrated in FIG. 1, the nanofiber manufacturing apparatus 100 includes a power generator 10, a controller 20, and an ejector 30. The direction of the arrow of FIG. 1 shows the direction in which the ejector 30 ejects the solution.

The nanofiber manufacturing apparatus 100 forms a nanofiber N on a collecting member 40 by ejecting, from the ejector 30, the solution in which a macromolecule substance or the like is dissolved and by electrically causing the ejected liquid to elongate inside a space. The nanofiber N that has a configuration having a smooth surface, a porous surface, a bead configuration, a core-sheath configuration, a hollow configuration, an ultrafine fiber, or the like is deposited on the collecting member 40 by the nanofiber manufacturing apparatus 100 of the embodiment.

The power generator 10 is a power supply device that applies a high voltage between the ejector 30 and the collecting member 40. The power generator 10 is, for example, a power supply device that uses a direct current power supply. For example, one terminal of the power generator 10 is electrically connected to the ejector 30; and the other terminal of the power generator 10 is grounded. Also, one end of the collecting member 40 is grounded. By such a connection, an electric potential difference can be generated between the ejector 30 and the collecting member 40.

The controller 20 controls the operations of the power generator 10 and the ejector 30. The controller 20 is electrically connected to the power generator 10 and the ejector 30. For example, the controller 20 controls the power generator 10 to determine the voltage value applied to the ejected liquid. Also, the controller 20 controls the ejector 30 to determine the rate of the ejected liquid. The controller 20 is, for example, a computer including a CPU (Central Processing Unit), memory, etc.

The ejector 30 is, for example, a nozzle that ejects the solution which is a material of which the nanofiber N is formed. The ejector 30 includes a tip portion 31 and a main body portion 32. The solution is ejected from the tip portion 31. The tip portion 31 is connected detachably to the main body portion 32.

In the case where the ejector 30 is a nozzle, the tip portion 31 is the nozzle head 50. As illustrated in FIG. 2, for example, the nozzle head 50 has a rectangular configuration when projected onto a plane perpendicular to the direction from the ejector 30 toward the collecting member 40. The configuration of the nozzle head 50 when viewed in cross-section may be a configuration such as a substantially circular configuration, a substantially elliptical configuration, etc.

The nozzle head 50 has, in the tip of the nozzle head 50, multiple nozzle holes 51 (holes) that the solution is ejected. In the case where the nozzle head 50 has a rectangular configuration when viewed in cross-section, the nozzle holes 51 are disposed to be arranged along the longitudinal direction of the nozzle head 50. The nozzle holes 51 may be disposed to be arranged along the transverse direction. Also, regardless of the configuration of the nozzle head 50 when viewed in cross-section, the nozzle holes 51 can be arranged on a straight line along any direction. Also, the nozzle holes 51 may be arranged on multiple straight lines along any direction.

The nozzle holes 51 may not be arranged on a straight line if the interval of the adjacent nozzle holes 51 can be maintained. For example, to maintain the interval of the adjacent nozzle holes 51, the nozzle holes 51 can be arranged from a center 50c of the nozzle head 50 toward an end portion 50t of the nozzle head 50.

The interval of the nozzle holes 51 and the position of the nozzle holes 51 will be described below in detail.

For example, the solution is stored in a tank, etc., provided separately from the ejector 30 and is supplied from the tank to the ejector 30 via a pipe. That is, a supply unit that supplies the solution to the ejector 30 may be provided in the nanofiber manufacturing apparatus 100. Also, the ejector 30 may be multiply provided. The multiple ejectors 30 can be disposed to be arranged on a straight line along any direction.

The solution is a liquid such that a solute that is used as the base material of the nanofiber N is dispersed or dissolved in a solvent, and is a liquid that is adjusted appropriately according to the material of the nanofiber N, the properties of the nanofiber N, etc. For example, a resin is used as the solute dispersed or dissolved in the solution. Also, a volatile organic solvent is used as the solvent used in the solution. An inorganic solid material may be added to the solution.

The collecting member 40 collects the nanofiber N manufactured in the space formed between the collecting member 40 and the ejector 30 by the nanofiber N being deposited. For example, the collecting member 40 is a substrate. The collecting member 40 may be a member having a sheet configuration. In the case where the collecting member 40 is a member having a sheet configuration, the nanofiber N may be deposited and collected in a state in which the collecting member 40 is wound onto a roll, etc. For example, in the case where the collecting member 40 is the member having the sheet configuration, a target can be provided to oppose a second surface 40b of the collecting member 40 to deposit the nanofiber N onto the member having the sheet configuration. In such a case, an electric potential difference can be generated between the ejector 30 and the target by the power generator 10.

The collecting member 40 has a first surface 40a and the second surface 40b. The first surface 40a is the surface on the side opposite to the second surface 40b. The nanofiber N is deposited on the first surface 40a of the collecting member 40.

Figure 3A:
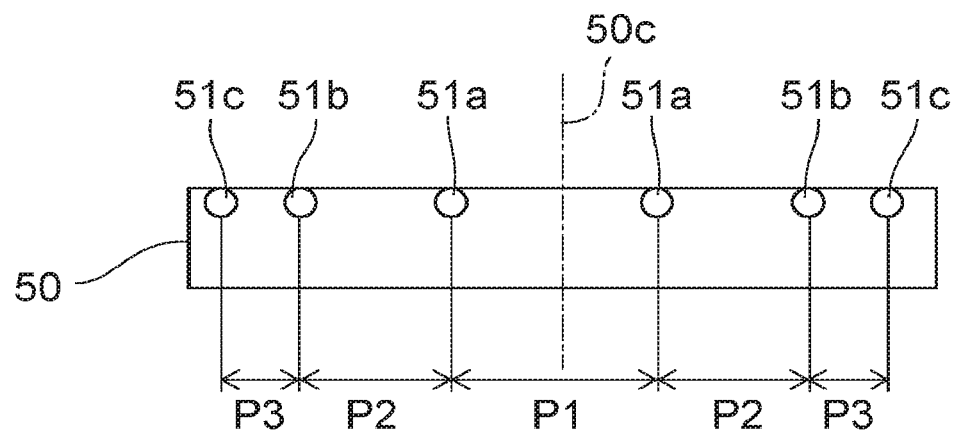
FIG. 3A and FIG. 3B are drawings describing the arrangement of nozzle holes.
Figure 3B:
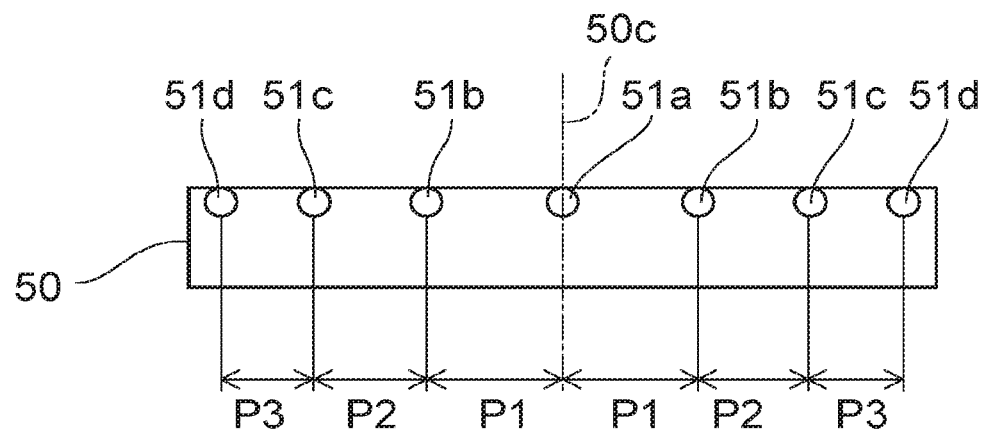

FIG. 3A and FIG. 3B are drawings describing the arrangement of the nozzle holes.

Figure 4:
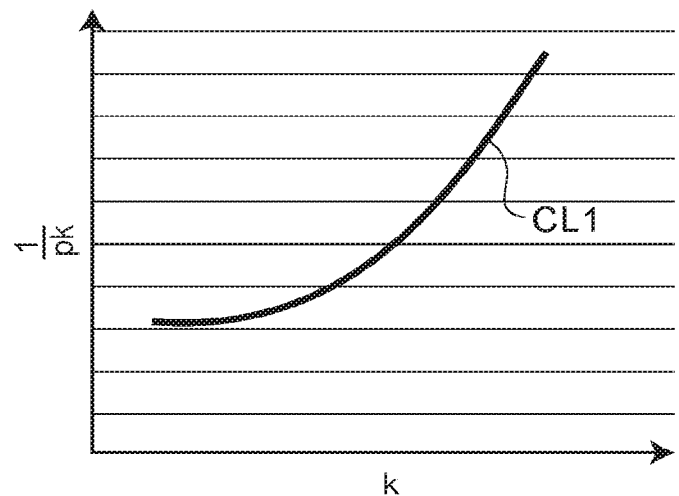
FIG. 4 is a graph showing the relationship between the interval of the nozzle holes and the interval number of the nozzle holes.

FIG. 4 is a graph showing the relationship between the interval of the nozzle holes and the interval number of the nozzle holes.

Figure 5:
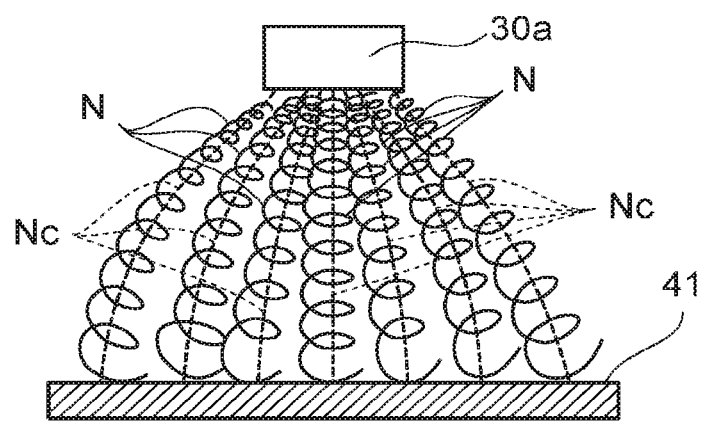
FIG. 5 is a drawing showing a reference example of nanofibers formed between the nozzle and the base material.

FIG. 5 is a drawing showing a reference example of nanofibers formed between the nozzle and the base material.

FIG. 3A and FIG. 3B show front views of the nozzle head 50 as viewed from the side that ejects the solution.

As illustrated in FIG. 3A, the multiple nozzle holes 51 are arranged symmetrically with respect to the center 50c of the nozzle head 50; and in the case where the number of the nozzle holes 51 provided in the nozzle head 50 is even, the interval of the adjacent nozzle holes 51 decreases away from the center 50c. Here, in the case where the multiple nozzle holes 51 are arranged on a straight line, the center 50c of the nozzle head 50 corresponds to the center of the straight line. In the case where the number of the nozzle holes 51 provided in the nozzle head 50 is even, any of the nozzle holes 51 is not disposed at the center 50c.

For example, six nozzle holes 51 are provided in the nozzle head 50; and the interval of nozzle holes 51a adjacent to each other with the center 50c of the nozzle head 50 interposed is taken as P1. Also, the interval between the nozzle hole 51a and a nozzle hole 51b disposed to be separated from the center 50c further than the nozzle hole 51a is taken as P2; and the interval between the nozzle hole 51b and a nozzle hole 51c disposed to be separated from the center 50c further than the nozzle hole 51b is taken as P3. In such a case, the multiple nozzle holes 51 are arranged so that the interval P2 is smaller than the interval P1; and the interval P3 is smaller than the interval P2. That is, the interval of the adjacent nozzle holes 51 decreases away from the center 50c.

When 2n (where n is a positive integer) nozzle holes 51 are provided in the nozzle head 50, and the interval of the nozzle holes 51 adjacent to each other with the center 50c of the nozzle head 50 interposed is taken as P1, the interval of the adjacent nozzle holes arranged to be most distal to the center 50c is taken as Pn. Also, the intervals of the nozzle holes 51 are taken as P1, P2, P3 to Pn−1, and Pn. In such a case, the interval P1 is the largest; and the interval Pn is the smallest. That is, the interval of the adjacent nozzle holes 51 decreases away from the center 50c. The interval decreases from P1 to Pn.

As illustrated in FIG. 3B, in the case where the multiple nozzle holes 51 are arranged symmetrically with respect to the center 50c of the nozzle head 50 and the number of the nozzle holes 51 provided in the nozzle head 50 is odd, the interval of the adjacent nozzle holes 51 decreases away from the center 50c. In the case where the number of the nozzle holes 51 provided in the nozzle head 50 is odd, the nozzle hole 51 is disposed at the center 50c.

For example, seven nozzle holes 51 are provided in the nozzle head 50; and the interval between the nozzle hole 51a disposed at the center 50c of the nozzle head 50 and the nozzle hole 51b disposed to be separated from the center 50c further than the nozzle hole 51a is taken as P1. Also, the interval between the nozzle hole 51b and the nozzle hole 51c disposed to be separated from the center 50c further than the nozzle hole 51b is taken as P2; and the interval between the nozzle hole 51c and a nozzle hole 51d disposed to be separated from the center 50c further than the nozzle hole 51c is taken as P3. In such a case, the multiple nozzle holes 51 are arranged so that the interval P2 is smaller than the interval P1, and the interval P3 is smaller than the interval P2. That is, the interval of the adjacent nozzle holes 51 decreases away from the center 50c.

When 2n+1 (where n is a positive integer) nozzle holes 51 are provided in the nozzle head 50, and the interval between the nozzle hole 51 disposed at the center 50c of the nozzle head 50 and the nozzle hole 51 disposed to be separated from the center 50c further than the nozzle hole 51 disposed at the center 50c is taken as P1, the interval of the adjacent nozzle holes arranged to be most distal to the center 50c is represented by Pn. Also, the intervals of the nozzle holes 51 are taken as P1, P2, P3 to Pn−1, and Pn. In such a case, the interval P1 is the largest; and the interval Pn is the smallest. That is, the interval of the adjacent nozzle holes 51 decreases away from the center 50c. The interval decreases from P1 to Pn.

As in FIG. 3A and FIG. 3B, whether the number of the nozzle holes 51 is even or odd, the nozzle holes 51 are arranged in the nozzle head 50 so that the interval of the adjacent nozzle holes 51 decreases away from the center 50c of the nozzle head 50. The interval of the adjacent nozzle holes 51 decreases from the center of the nozzle head 50 toward the end portion of the nozzle head 50. Also, because the multiple nozzle holes 51 are arranged symmetrically with respect to the center 50c of the nozzle head 50, the intervals of the nozzle holes 51 are provided to be symmetric with respect to the center 50c. By such an arrangement of the nozzle holes 51, the nanofibers N can be deposited uniformly on the collecting member 40.

For example, in the case where twelve nozzle holes 51 are provided in the nozzle head 50 (the case where n=6), the intervals (millimeters) of the nozzle holes 51 are such that P1 is set to 31.0 millimeters, P2 is set to 30.9 millimeters, P3 is set to 29.7 millimeters, P4 is set to 26.2 millimeters, P5 is set to 21.1 millimeters, and P6 is set to 16.6 millimeters.

In the case where the intervals of the nozzle holes 51 are thus set, the intervals of centers Nc of the fiber paths at the collecting member 40 of the nanofibers N deposited onto the collecting member 40 from the nozzle holes 51 are 33.3 millimeters and are substantially uniform. For example, the interval of the nanofibers N is calculated from the interval of the center positions of the nanofibers N deposited onto the collecting member 40 from the nozzle holes 51.

For example, in the case where sixteen nozzle holes 51 are provided in the nozzle head 50 (the case where n=8), the intervals (millimeters) of the nozzle holes 51 are such that P1 is set to 22.66 millimeters, P2 is set to 22.66 millimeters, P3 is set to 22.5 millimeters, P4 is set to 21.5 millimeters, P5 is set to 19.4 millimeters, P6 is set to 16.7 millimeters, P7 is set to 14.1 millimeters, and P8 is set to 11.8 millimeters.

In the case where the intervals of the nozzle holes 51 are thus set, the intervals of the centers Nc of the fiber paths at the collecting member 40 of the nanofibers N deposited onto the collecting member 40 from the nozzle holes 51 are 24.4 millimeters and are substantially uniform.

For example, in the case where thirteen nozzle holes 51 are provided in the nozzle head 50 (the case where n=6), the intervals (millimeters) of the nozzle holes 51 are such that P1 is set to 28.3 millimeters, P2 is set to 28.2 millimeters, P3 is set to 26.5 millimeters, P4 is set to 23.1 millimeters, P5 is set to 18.8 millimeters, and P6 is set to 15.1 millimeters.

In the case where the intervals of the nozzle holes 51 are thus set, the intervals of the centers Nc of the fiber paths at the collecting member 40 of the nanofibers N deposited onto the collecting member 40 from the nozzle holes 51 are 30.5 millimeters and are substantially uniform.

For example, in the case where fifteen nozzle holes 51 are provided in the nozzle head 50 (the case where n=7), the intervals (millimeters) of the nozzle holes 51 are such that P1 is set to 24.3 millimeters, P2 is set to 24.1 millimeters, P3 is set to 23.5 millimeters, P4 is set to 21.5 millimeters, P5 is set to 18.5 millimeters, P6 is set to 15.3 millimeters, and P7 is set to 12.7 millimeters.

In the case where the intervals of the nozzle holes 51 are thus set, the intervals of the centers Nc of the fiber paths at the collecting member 40 of the nanofibers N deposited onto the collecting member 40 from the nozzle holes 51 are 26.2 millimeters and are substantially uniform.

Also, whether the number of the nozzle holes 51 is even or odd, the nozzle holes 51 can be arranged in the nozzle head 50 to have a prescribed numerical relationship between the interval and interval number of the nozzle holes 51.

For example, as illustrated in FIG. 4, a reciprocal 1/Pk and an interval number k of the interval of the nozzle holes 51 can be expressed as a curve CL1 of a prescribed quadratic function ($f(k)=ak^2+bk+c$, where a to c are any constants). Here, the interval number k is the order of the interval of the nozzle holes 51 provided in order from the center 50c of the nozzle head 50. For example, the interval number k is a value from 1 to n; and in the case where there is an odd number of nozzle holes 51, the interval number k is the value of half of the number of the intervals. In the case where there is an even number of nozzle holes 51, the interval number k is the value of half of the value of 1 added to the number of the intervals. The curve CL1 is, for example, a curve having a downward protrusion (a curve being convex downward).

In the embodiment, the nozzle holes 51 are arranged in the nozzle head 50 so that the interval of the adjacent nozzle holes 51 decreases away from the center 50c of the nozzle head 50. However, this is not limited thereto. The values of at least some of the intervals may be set to be the same; and, for example, the interval P1 and the interval P2 may be set to the same value; and the numerical values may be set to decrease from the interval P3 to the interval Pn.

In the embodiment, the nozzle holes 51 are arranged on one straight line so that the interval of the adjacent nozzle holes 51 decreases away from the center 50c of the nozzle head 50. However, this is not limited thereto. For example, the nozzle holes 51 may be arranged on multiple straight lines along any direction. In such a case, the nozzle holes 51 can be arranged so that, for the nozzle holes 51 arranged on each straight line, the interval of the adjacent nozzle holes 51 decreases away from the center 50c of the nozzle head 50.

Also, as described above, the nozzle holes 51 may not be arranged on a straight line if the interval of the adjacent nozzle holes 51 can be maintained. For example, the nozzle holes 51 can be arranged from the center 50c of the nozzle head 50 toward the end portion of the nozzle head 50 so that the interval of the adjacent nozzle holes 51 decreases away from the center 50c of the nozzle head 50. In such a case, the nozzle holes 51 may be arranged symmetrically or may be arranged asymmetrically with respect to the center 50c of the nozzle head 50. For example, the nozzle holes 51 can be arranged on a curve or a zigzag in the outward direction from the center 50c of the nozzle head 50.

Here, in the nanofiber manufacturing apparatus that uses electrospinning, there are cases where the nozzle that is used ejects a ejected liquid to which a voltage is applied and includes a nozzle head having multiple nozzle holes disposed to be arranged on a straight line in the nozzle. However, in the case where such a nozzle is used, the ejected liquid spreads easily in the outward direction of the nozzle due to the structure of the nozzle and the dimensional relationship of the nozzle and the base material. Also, the ejected liquid spreads easily in the outward direction of the nozzle due to effects of the electric field as well. For example, as illustrated in FIG. 5, the nanofibers N that are formed from the ejected liquid from a nozzle 30a spread to spin with respect to the centers Nc of the paths (the fiber paths); and the nanofibers N that are formed from the end portion of the nozzle 30a are deposited distal to the center of a base material 41. Thereby, it is difficult to uniformly deposit the nanofibers on the base material.

In the nanofiber manufacturing apparatus 100 of the embodiment, the nozzle holes 51 are arranged in the nozzle head 50 so that the interval of the adjacent nozzle holes 51 decreases away from the center 50c of the nozzle head 50.

The nanofibers N are easily deposited uniformly on the collecting member 40 by such an arrangement of the nozzle holes 51.

According to the embodiment, a nanofiber manufacturing apparatus having increased productivity is provided.

Figure 6:
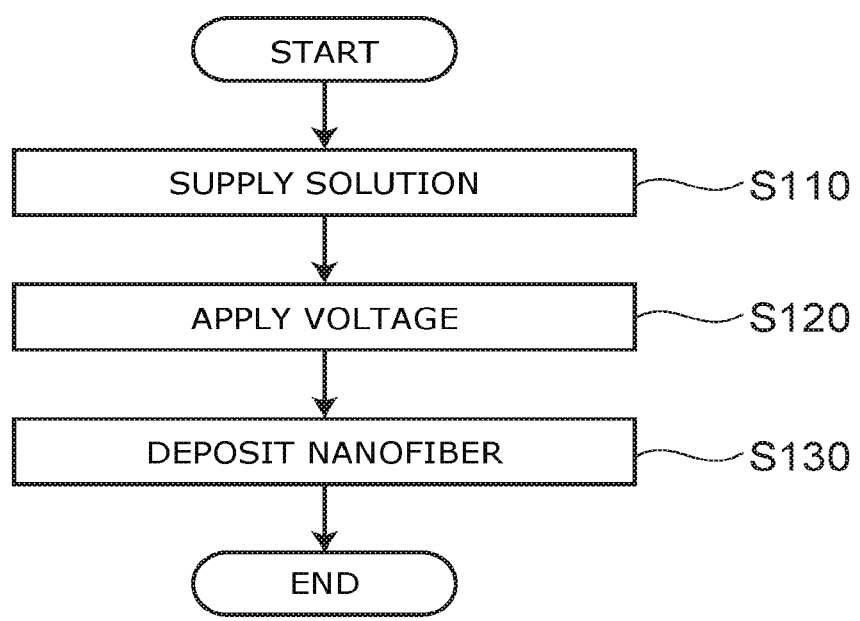
FIG. 6 is a flowchart showing a nanofiber manufacturing method.

FIG. 6 is a flowchart showing a nanofiber manufacturing method.

The method for manufacturing the nanofibers N using the nanofiber manufacturing apparatus 100 will be described.

A solution is supplied to the ejector 30 (step S110). The ejector 30 is a nozzle. The solution is stored in the nozzle.

A voltage is applied between the ejector 30 and the collecting member 40 by the power generator 10 (step S120). When the electrostatic force becomes larger than the surface tension due to the application of the high voltage, the solution is ejected from the nozzle holes 51 of the nozzle head 50.

The nozzle holes 51 are arranged in the nozzle head 50 so that the interval of the adjacent nozzle holes 51 decreases away from the center 50c of the nozzle head 50. Also, the nozzle holes 51 are provided to be symmetric with respect to the center 50c of the nozzle head 50. By such an arrangement of the nozzle holes 51, the nanofibers N can be deposited uniformly on the collecting member 40.

The nanofibers N that are manufactured between the ejector 30 and the collecting member 40 are deposited on the collecting member 40 (step S130).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A nanofiber manufacturing-apparatus nozzle head, comprising a plurality of holes, a solution being ejected from the holes, the holes being arranged on a straight line passing through a center of a face of the nozzle head,
   wherein the holes include:
   a first hole,
   a second hole,
   a third hole being located between the first hole and the second hole and being adjacent to the first hole, and
   a fourth hole being located between the second hole and the third hole and being adjacent to the second hole and the third hole, a first interval between the first hole and the third hole is larger than a second interval between the third hole and the fourth hole, the second interval is larger than a third interval between the second hole and the fourth hole.

2. The nozzle head according to claim 1, wherein
   the holes are arranged toward a plurality of directions outward from the center, and
   the holes are provided with the same number of holes in each outward direction.

3. The nozzle head according to claim 1, wherein the holes are arranged symmetrically with respect to the center.

4. The nozzle head according to claim 1, the second interval is assigned a first number and the third interval is assigned a second number which is 1 greater than the first number, and wherein a relationship between a reciprocal of the second interval with the first number and a relationship between a reciprocal of the third interval with the second number are both represented by the same quadratic function, $ak^2+bk+c$, where a, b, and c are constants, and k is the number assigned to the respective interval.

5. The nozzle head according to claim 1, wherein
   the number of the holes is an odd number, and
   the first hole is disposed on the center.

6. The nozzle head according to claim 1, wherein
   the number of the holes is an even number, and
   the center is positioned between the first hole and the third hole.

7. A nanofiber manufacturing apparatus, comprising:
   an ejector including a nozzle head and ejecting a solution from a plurality of holes toward a collecting member, the holes being provided in the nozzle head, the solution being ejected from the holes, the holes being arranged on a straight line passing through a center of a face of the nozzle head; and
   a power generator generating an electric potential difference between the ejector and the collecting member,
   wherein the holes include:
   a first hole,
   a second hole,
   a third hole being located between the first hole and the second hole and being adjacent to the first hole, and
   a fourth hole being located between the second hole and the third hole and being adjacent to the second hole and the third hole, a first interval between the first hole and the third hole is larger than a second interval between the third hole and the fourth hole, the second interval is larger than a third interval between the second hole and the fourth hole.

8. The apparatus according to claim 7 wherein
   the holes are arranged toward a plurality of directions outward from the center, and
   the holes are provided with the same number of holes in each outward direction.

9. The apparatus according to claim 7, wherein the holes are arranged symmetrically with respect to the center.

10. The apparatus according to claim 7, wherein the second interval is assigned a first number and the third interval is assigned a second number which is 1 greater than the first number, and wherein a relationship between a reciprocal of the second interval with the first number and a relationship between a reciprocal of the third interval with the second number are both represented by the same quadratic function, $ak^2+bk+c$, where a, b, and c are constants, and k is the number assigned to the respective interval.

11. The apparatus according to claim 7, wherein
    the number of the holes is an odd number, and
    the first hole is disposed on the center.

12. The apparatus according to claim 7, wherein
    the number of the holes is an even number, and
    the center is positioned between the first hole and the third hole.

* * * * *